Feb. 27, 1934.   W. M. SANDERS   1,948,888
METHOD OF MANUFACTURING ALUMINA
Filed April 22, 1932
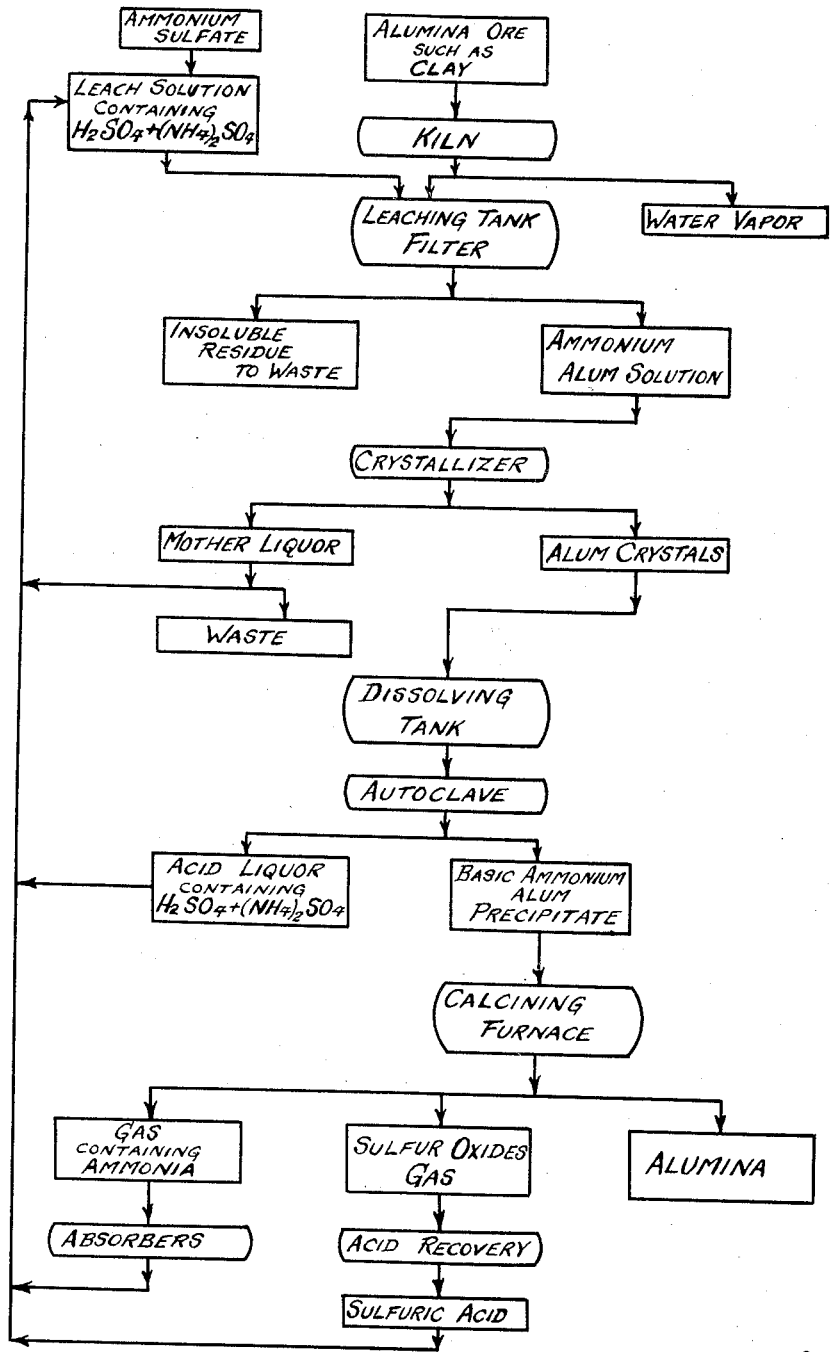
Inventor
Walter Murray Sanders, deceased,
Louise D. Sanders, administratrix,
By Francis J. Chambers
Attorney Patented Feb. 27, 1934

1,948,888

UNITED STATES PATENT OFFICE 1,948,888

METHOD OF MANUFACTURING ALUMINA

Walter Murray Sanders, deceased, late of Montclair, N. J., by Louise D. Sanders, administratrix, Montclair, N. J., assignor, by mesne assignments, to Kalunite Company, a corporation of Delaware Application April 22, 1932. Serial No. 606,910

2 Claims. (Cl. 23—143)

This invention relates to the manufacture of alumina. Heretofore, it has been proposed to manufacture alumina by a process in which a normal alum is calcined to eliminate from the aluminum sulphate constituent of the alum the sulphur trioxide combined with it in the alum and then to separate the alumina thus produced from the alkali sulphate constituent of the alum by leaching and, to avoid difficulties incident to the fusibility of the alum, it has been proposed to dehydrate the alum before raising it to a calcining temperature sufficient to eliminate the sulphur trioxide. These processes have not been successful as practical manufacturing processes, owing to the expense and difficulty of effecting the preliminary dehydration of the alum and owing, also, to the tendency of the calcining operation to form pyrosulphates which form gummy masses at the temperature of the calcination, which prevents the complete dissociation of the aluminum sulphate constituent; the formation of the gummy mass also seriously interferes with any practical furnacing of the alum.

It has been proposed to recover alumina from ammonium alum by the process above indicated but the difficulties involved in the dehydration of ammonium alum have been greater than is the case with alkali metal alum, largely due to the expansion of the material under treatment so that it forms a very light and porous dehydrated alum which is very difficult to treat by any practical furnacing operation.

It has also been proposed to manufacture potassium sulphate and recover the impure alumina as a byproduct by calcining high grade alunite ores, that is to say, ores consisting largely of a compound of potassium, aluminum and sulphur of the following composition:

$K_2SO_4.3Al_2O_3.3SO_3.6H_2O$ at temperatures which will drive off the sulphur trioxide combined with the alumina constituent of the ore and then separating the soluble sulphate of potassium from the impure alumina thus produced by leaching. The alunite ores contain, in addition to the pure alunite compound above mentioned, various other constituents, such as silica, ferric oxide, titania, phosphorous pentoxide and calcium oxide and, in the described treatment of the alunite ore, these constituents remain associated with the alumina as impurities. The process involving the calcining of alunite ores has been found to involve very considerable dust losses and also to require an unduly protracted furnacing operation. The crushing operations involved in the treatment of alunite ores are also an element of considerable expense which, naturally, increases with the fineness of the particle size to which the ore is reduced while, on the other hand, for the best results both in eliminating the sulphur trioxide and the leaching out of the potassium sulphate, a very fine division is essential.

Another obvious drawback to the treatment of alunite ores is that, being a natural product, they vary considerably in composition and especially in the amount of impurities, thus necessitating, for the best results, constant changes and modifications of the conditions in the calcining and leaching operations.

It has also been proposed to produce alumina by calcining a normal aluminum sulphate but such a practice is objectionable for two reasons. First, that it involves great difficulties in the dehydration of the aluminum sulphate; and, second, that it produces a dehydrated sulphate of alumina in a very light and porous condition which it is difficult to handle in furnacing and from which, by reason of its very large surface, it is difficult to eliminate its sulphur trioxide constituent in any practical furnacing operation.

It has also been proposed to produce alumina by first producing a basic sulphate of alumina and calcining this material at temperatures which will eliminate its water and sulphur trioxide components. Such a process would probably avoid serious difficulties in dehydration and would probably result in the production of a substantially pure alumina but it is open to the objection that, so far as known, no process has been developed by which it is practical on a manufacturing scale to obtain the basic sulphate of alumina.

Attention has been called to the disclosures made in the Swedish patents to Hultman, Nos. 54,114 and 57,812, in which patents mention is made of a process in which a precipitate obtained from a normal ammonium alum by heating to a high temperature is treated by calcination for the purpose of driving off the ammonia and sulphur trioxide components of the precipitate. The disclosure in these patents indicates that the patentee was ignorant as to the composition of the precipitate and, in the case of both patents, there is an entire failure to describe what has been found to be essential steps in the calcination of the precipitate to secure a pure alumina and, at the same time, to salvage the ammonia and sulphur trioxide components of the precipitate.

The object of this invention is to provide a method, by means of which alumina of practically any degree of purity desired can be produced by uniform and not unduly expensive methods of treatment and by means of which the byproducts incident to the production and separation of the alumina can also be obtained in good condition for reuse or sale and, broadly speaking, this invention consists in employing as a base material a precipitated basic alum of fine particle size, calcining this basic alum at temperatures which will drive off the sulphur trioxide combined with the basic aluminum sulphate of the basic alum and any other volatile products produced by the calcination, and which, in the case of alkali metal alum, will not volatilize alkali sulphate or induce reaction between alkali sulphate and alumina and then separating the alkali metal component, if present, of the basic alum from the produced alumina by leaching.

The present invention is limited to a process in which the starting material is a normal ammonium alum, the application of the broad invention to the treatment of alkali metal alums forming the subject matter of another copending application.

The composition of a normal ammonium alum is as follows:

$$(NH_4)_2SO_4.Al_2(SO_4)_3.24H_2O.$$

This process involves the heating of a solution of the normal ammonium alum under pressure to temperatures between 140° and 200° C. to effect the formation and precipitation of a finely divided precipitate, consisting of a basic ammonium alum whose composition is as follows:

$$(NH_4)_2SO_4.3Al_2O_3.4SO_3.9H_2O.$$

This reaction produces a mother liquor containing in solution the sulphuric acid and ammonium sulphate components of the normal alum which have not entered into the composition of the basic alum precipitate and any undecomposed alum, a more complete reaction can be obtained by adding to the normal alum solution a solution of ammonium sulphate, preferably equal in quantity to the ammonium sulphate constituent of the normal alum and this additional ammonium sulphate will remain in solution in the mother liquor. After separation of the basic ammonium alum from the mother liquor, it is calcined, preferably in two stages. First, it is calcined at a temperature between 500° and 600° C., which effects the dehydration of the alum and at the same time the elimination of the ammonium sulphate component of the alum. This elimination takes place partly by the volatilization of a portion of the ammonium sulphate and partly by decomposition of the ammonium sulphate, the ammonia component of which is volatilized while its sulphur trioxide component is also volatilized and eliminated by first combining with the basic aluminum sulphate and then, at a later stage, dissociating from its combination with the aluminum sulphate and passing off as sulphur dioxide.

The temperature of the residual aluminum sulphate which will have the approximate formula:

$$3Al_2O_3.4SO_3$$

is next raised to from 700° to 1000° C., with the result of driving off the sulphur trioxide which, at these temperatures, will partly dissociate to sulphur dioxide. The residual calcine will be found to be a substantially pure alumina. The process also involves the recovery of the ammonia and ammonium compounds as ammonium sulphate by well known methods and the recovery of the sulphur gases, to such an extent as may be found economical, as sulphuric acid, also by well known methods, and the use of the values thus recovered and those remaining in the mother liquor from which the basic alum is precipitated in the preparation of additional normal alum solutions to be treated as described.

Where a sulphur free alumina product is required, the calcination consisting of substantially pure alumina may be treated with a dilute solution of a reagent having a greater affinity for sulphur trioxide than that of the alumina, such reagent having the property of forming with sulphur trioxide a soluble sulphate. The product of this treatment can be separated from the alumina by leaching. As examples of efficient reagents for this, there would be mentioned hydroxides and carbonates of ammonium potassium and sodium.

The residual product of the calcination is alumina and the preparation of a pure alumina in this way is greatly facilitated by the fine particle size and the physical construction of the basic ammonium alum used as a starting material.

While the process, broadly speaking, is applicable to the described treatment of any precipitated basic ammonium alum, it will be most usefully practiced in connection with the treatment of aluminum ores, practically free from insoluble alkali metal constituents, the treatment involving the leaching of the ore which, in most cases, should be dehydrated by roasting them at temperatures of approximately 600° C., by leaching them with sulphuric acid in sufficient quantity to react with their alumina content to form the sulphate of alumina. The soluble sulphate is separated from the gangue by leaching and with it is admixed sufficient ammonium sulphate to form a normal ammonium alum solution. This solution, after separation from any insoluble matter, is, if necessary, concentrated and preferably cooled to a point at which the normal ammonium alum will crystallize and under conditions which will eliminate any iron or other impurities which it is desired to get rid of, after which the alum crystals are redissolved to form preferably an alum solution of 80% strength. This alum solution is then heated under pressure to a temperature which will cause the precipitation from the solution of a basic ammonium alum having the composition:

$$(NH_4)_2SO_4.3Al_2O_3.4SO_3.9H_2O$$

and having the small particle size characteristic of precipitates. This particular size has been found to approximate—150 mesh, where the temperature of the alum solution is raised to 200° C., which temperature has been found the best for practical working of the process and to result in the precipitation of a basic ammonium alum containing approximately 80% of the alumina content of the normal alum converted into basic alum. A more perfect elimination of the alumina content of the normal alum can be obtained where ammonium sulphate is added to the normal alum solution in quantity approximating the ammonium sulphate content in the normal alum.

The reaction brought about by heating the normal alum solution results in a mother liquor containing approximately 55% of the sulphur trioxide content of the aluminum sulphate component of the normal alum, the mother liquor containing also 67% of the ammonium sulphate content of the normal alum and these values are conserved by using the mother liquor with such addition of sulphuric acid and of ammonium sulphate as may be necessary to dissolve out the alumina content of further bodies of ore and to provide suffiicent ammonium sulphate to impart to the leach the quality of a normal ammonium alum solution. The additional sulphuric acid necessary for the treatment of the ore can be supplied in large part by the salvaging and conversion into sulphuric acid of the sulphur trioxide and dioxide gases eliminated in the calcining of the basic ammonium alum and the necessary addition of ammonium sulphate can be provided in large part by the salvaging and conversion into ammonium sulphate of the ammonia and ammonium compounds driven off during the calcining of the basic alum. The cyclical use of the sulphuric acid and ammonium sulphate enables the process to be carried on economically, only such additional sulphuric acid and ammonium sulphate being required as would make up losses which are necessarily or practically unavoidable in the cyclical process described.

As an example of the carrying out of the process, a soft Georgia kaolin of the composition

|   | Per cent |
|---|---|
| Alumina | 38.01 |
| Water | 14.27 |
| Silica | 44.65 |
| Potash | 0.17 |
| Calcium oxide | 0.04 |
| Magnesia | 0.13 |
| Ferric oxide | 1.20 |
| Titania | 1.44 |
| Phosphorous pentoxide | 0.09 | was used as starting material.

The kaolin is disintegrated and roasted for one hour at 600° C. in a rotary kiln, thereby eliminating the water content, increasing the rate of solution of the alumina in the acid, and decreasing the iron oxide solubility to 25% of the total present in the ore.

After cooling to 200° C., the calcine is treated with an acid solution containing 14% sulphuric acid and 6.3% ammonium sulphate in pachuca tanks arranged for counter-current flow. The reaction is complete in one hour. 90% of the alumina present in the calcine is dissolved as aluminum sulphate. Sufficient ore is used to neutralize the sulphuric acid of the leaching solution. The silica will be unattacked, and negligible traces only of potash and titania dissolved. About 50% of the calcium oxide, magnesia, and phosphorous pentoxide will be found in the neutral alum solution, which will be an approximately 55% ammonium alum solution.

A solution of barium sulphide is fed into the last pachuca tank to reduce the dissolved ferric sulphate to ferrous sulphate, in which case the alum crystallized will be iron-free.

The major portion of the insoluble residue is separated by settling in cones, which also function as washers. The finely divided insoluble residue which is not settled in the cones is removed from the liquor by filtration through filter presses, yielding a clear alum solution.

The clear ammonium alum solution, discharged at a temperature of 80° C. from the filter presses, is cooled and crystallized in spray coolers. The crystals and mother liquor are separated by settling and filtration on a vacuum type filter, where the crystals are washed. About one-third of the mother liquor is cooled from room temperature to 0° C. by refrigeration, the alum crystals removed and the refrigerated liquor discarded. The remaining mother liquor is returned to the system and used to make up fresh batches of leach solution.

The alum crystals are dissolved by condensing steam to make an 80% solution, which is heated to 200° C. in an autoclave. 80% of the alumina will be precipitated as a basic ammonium alum with the simultaneous formation of a sulphuric acid-ammonium sulphate solution. After cooling, the precipitate is separated from the liquor by settling and filtration on a vacuum filter, on which the precipitate is washed. The mother liquor is returned to the leach system to make up the fresh solvent required. The precipitate discharged from the filter contains moisture up to 30% of the dry weight.

Drying and calcination are carried out in a multiple muffle hearth furnace, in which the ammonia gases liberated at 600° C. are conveniently separated from the sulphur oxide gases liberated at the higher temperatures. The heating of the last hearth is by direct flame on the material and a temperature of 1000° C. is attained.

The ammonia gases are recovered in an absorption tower using the regenerated acid solution from the basic alum precipitation as the absorbent.

The sulphur gases are converted into sulphuric acid in a lead chamber plant and the sulphuric acid returned to the system to be used in the leach solution.

The alumina discharged from the furnace is cooled and is ready for use in the arts.

By reference to the flow sheet forming a part of this specification, the above minutely described cyclical process for producing alumina from alunite ores as a starting material, with salvaging and cyclical re-use, to the extent desirable, of ammonium alum, can be readily followed.

Having now described the invention, what is claimed as new and desired to secure by Letters Patent, is:

1. The method of manufacturing alumina which consists in calcining a basic ammonium alum at temperatures between 500° and 600° C. to decompose its ammonium sulphate constitutent and drive off ammonia, together with the combined water of the basic alum and simultaneously effecting a reaction between the sulphur trioxide component of the ammonium sulphate with the basic alumina constituent of the basic alum, recovering the ammonia thus eliminated from the basic alum, then increasing the calcining temperature, to which the residual basic aluminum sulphate is subjected, to from 700° to 1000° C. to decompose the aluminum sulphate and drive off as anhydrous gas its sulphur trioxide component and recovering sulphuric acid from said anhydrous gas.

2. The method of manufacturing alumina from ores of alumina which consists in dehydrating an ore of alumina to render its alumina content soluble in sulphuric acid solution, treating said dehydrated ore with a solution of sulphuric acid and of ammonium sulphate to convert its alumina content into aluminum sulphate and produce an ammonium alum solution, separating said solution from insoluble constituents of the ore, heating a solution of the ammonium alum so prepared at temperatures in excess of 140° C. to effect the formation and precipitation of a basic ammonium alum and the formation of a mother liquor containing in solution sulphuric acid, ammonium sulphate and some undecomposed ammonium alum, calcining the basic ammonium alum so produced at temperatures between 500° and 600° C. to effect the decomposition of the ammonium sulphate constituent of the basic alum with elimination by vaporization of its ammonium constituent and the simultaneous reaction between the sulphur trioxide constituent of the ammonium sulphate and the residual basic aluminum sulphate, salvaging the ammonia so eliminated, then raising the calcining temperature to between 700° and 1000° C. to decompose the residual basic aluminum sulphate and drive off the sulphur trioxide constituent in the form of anhydrous gas, converting said anhydrous gas into sulphuric acid and using the mother liquor from which the basic alum is precipitated, together with the ammonia and sulphuric acid recovered during the calcination of the basic alum in the treatment of further bodies of alumina ores.

LOUISE D. SANDERS,
*Administratrix of the Estate of Walter Murray Sanders, Deceased.*